United States Patent [19]

Harber et al.

[11] Patent Number: 4,840,497
[45] Date of Patent: Jun. 20, 1989

[54] SUNSHADES STORAGE CASE

[76] Inventors: Sue E. Harber; James L. Harber, both of 345 Clifton Rd., South Charleston, Ohio 45368

[21] Appl. No.: 167,102

[22] Filed: Mar. 11, 1988

[51] Int. Cl.$^4$ .................. B65D 30/10; B65D 33/17
[52] U.S. Cl. .................... 383/4; 116/63 P; 160/84.1; 206/459; 206/494; 206/573; 206/803; 224/277; 224/311; 383/34
[58] Field of Search .............. 206/803, 494, 459, 573; 383/4, 34, 34.1; 116/63 P; 190/1; 224/277, 311; 160/84.1

[56] References Cited

U.S. PATENT DOCUMENTS

| | | |
|---|---|---|
| D. 214,308 | 6/1969 | Matsuo . |
| 214,309 | 6/1969 | Matsuo . |
| D. 244,914 | 7/1977 | Nicol . |
| D. 246,510 | 11/1977 | Lin . |
| 1,578,675 | 3/1926 | Moon .................. 224/311 |
| 2,083,029 | 6/1937 | Lowy ................... 383/34 |
| 2,517,119 | 8/1950 | Le Duc ............... 116/63 P |
| 2,640,596 | 6/1953 | Reeder ................ 224/277 |
| 2,647,550 | 8/1953 | Cannon ............... 383/34 |
| 2,663,576 | 12/1953 | Berman ............... 224/277 |
| 3,494,499 | 2/1970 | Plog et al. ........... 206/459 |
| 3,547,340 | 12/1970 | McDonald . |
| 3,550,839 | 12/1970 | Clayton et al. . |
| 3,741,382 | 6/1973 | Larimer ............... 206/573 |
| 3,744,623 | 7/1973 | Woofter ............... 224/277 |
| 3,782,434 | 1/1974 | Lebherz . |
| 4,202,396 | 5/1980 | Levy ..................... 160/84.1 |
| 4,444,343 | 4/1984 | Perlsweig ............ 224/277 |
| 4,652,039 | 3/1987 | Richards ............. 160/84.1 |
| 4,671,334 | 6/1987 | Yodegar et al. ..... 160/84 R |
| 4,727,920 | 3/1988 | Siegler ................ 160/84.1 |
| 4,763,947 | 8/1988 | Gregg .................. 160/370.2 |

FOREIGN PATENT DOCUMENTS 1543419 9/1968 France ................. 116/63 P

Primary Examiner—Stephen P. Garbe
Attorney, Agent, or Firm—Jerry T. Kearns

[57] ABSTRACT

In a first embodiment, a storage case for conventional accordion-fold cardboard sunshades is formed as an elongated generally rectangular case. The case is closed on three sides and is open at one end for the reception of the folded cardboard sunshades. The case is formed from two generally rectangular rigid plastic sheets which are joined along two longitudinal sides and on along bottom edges by strips of a flexible plastic sheet material. The case may be compressed to a minimum thickness when the sunshades are removed, but expands to accommodate the sunshades in a protected environment. In a second embodiment, the sunshades case is formed as a generally rectangular receptacle having one open end provided with a hinged support bracket. The receptacle is formed from a tough flexible plastic sheet material and may be printed with a warning sign for use by motorists as a highway distress signal. The receptacle has a trapezoidal configuration when the supporting bracket is folded to an open position and has an upper end provided with a socket for receiving a highway flare.

4 Claims, 4 Drawing Sheets

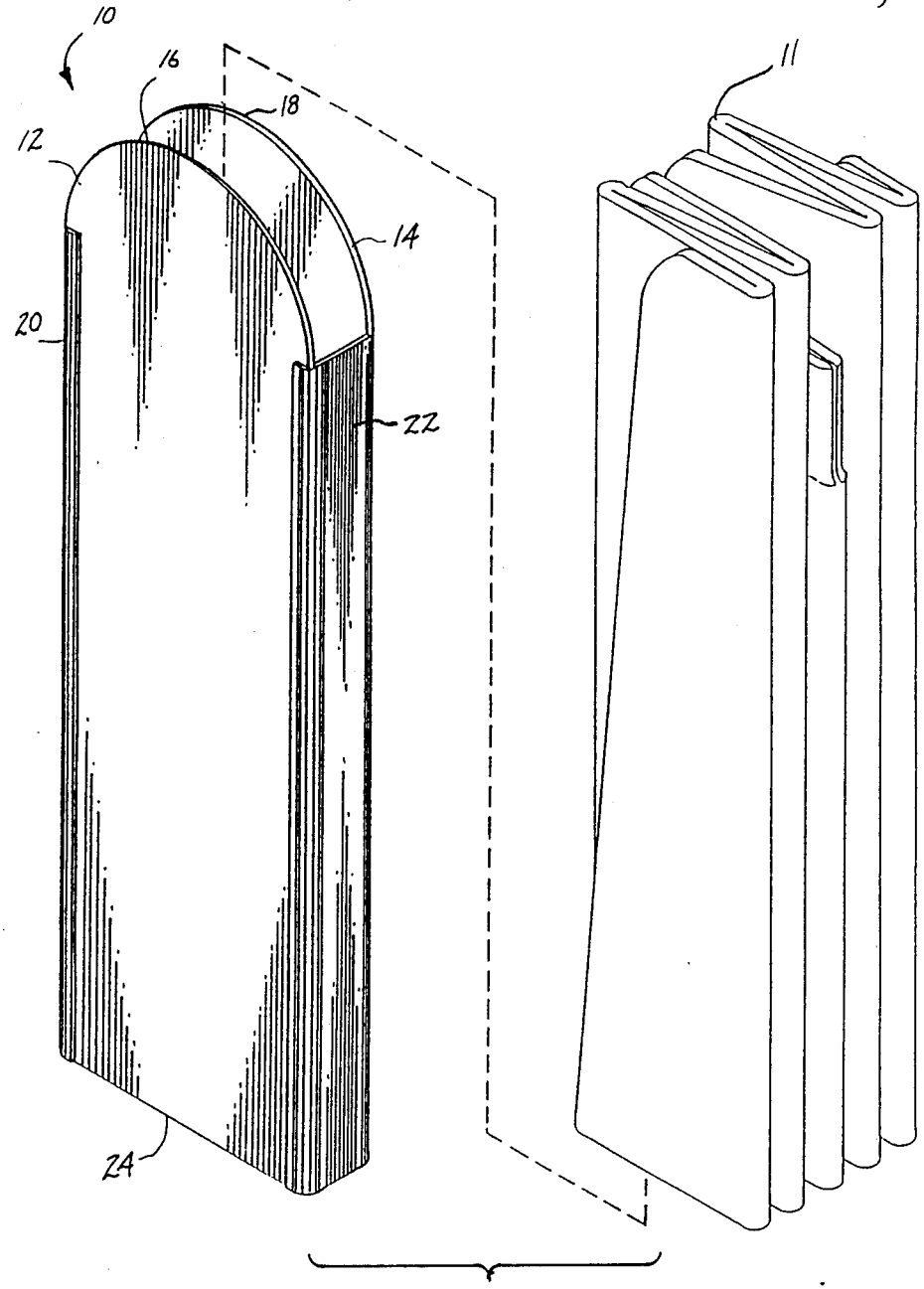

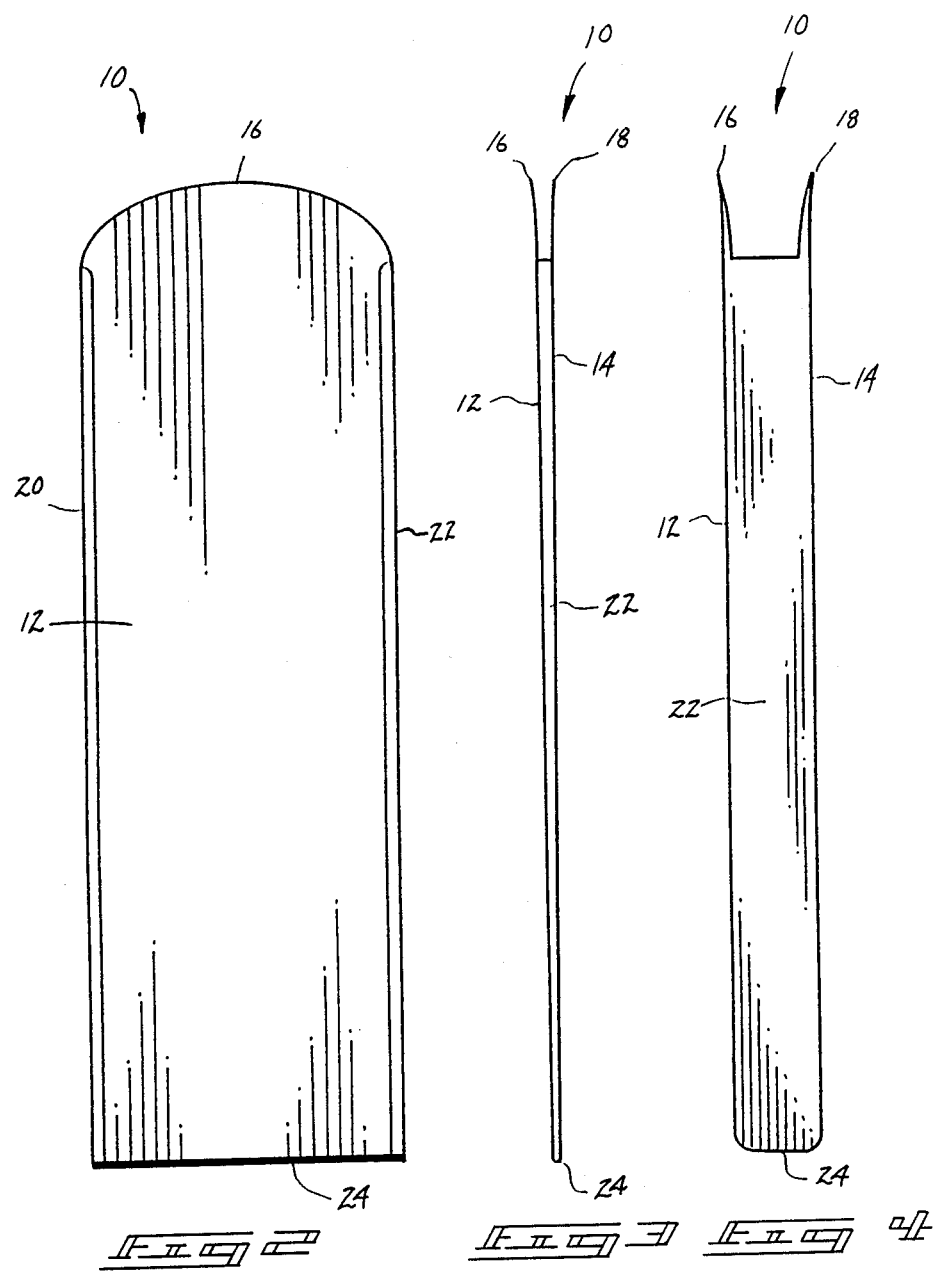

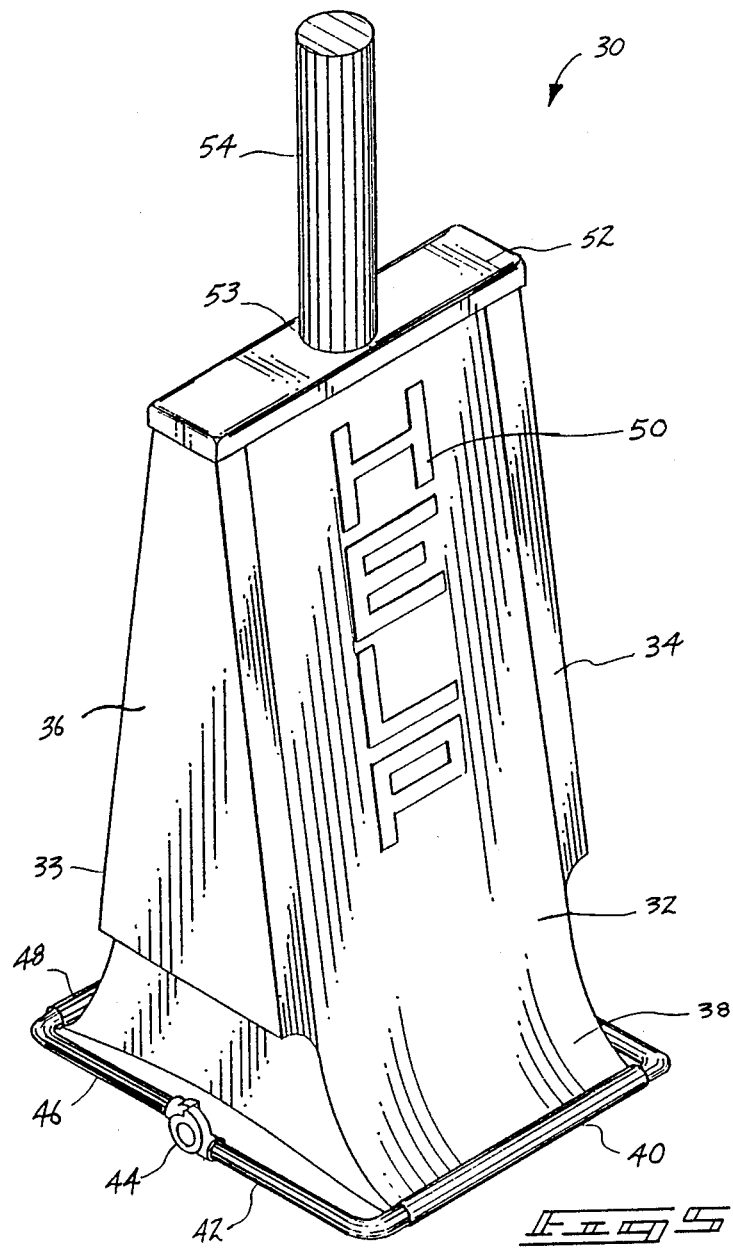

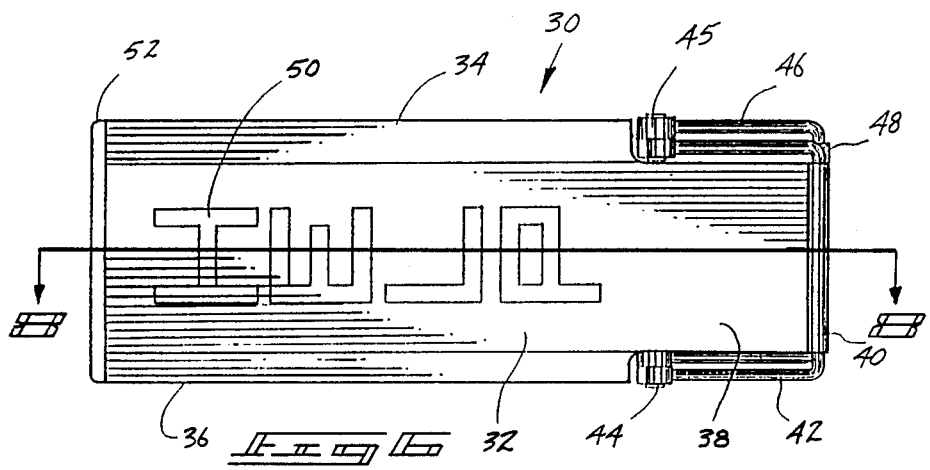
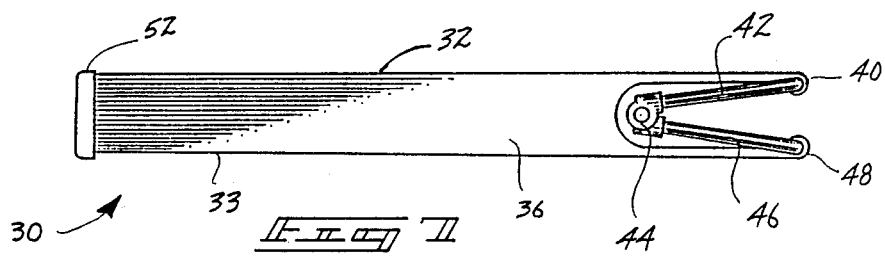
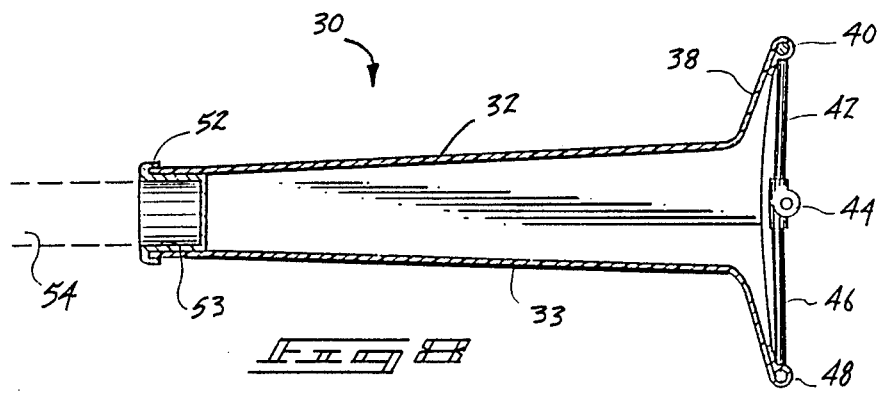

SUNSHADES STORAGE CASE

BACKGROUND OF THE INVENTION

1. Field of the Invention

The present invention relates to storage cases, and more particularly pertains to a storage case for conventional accordion-fold cardboard automobile sunshades. These sunshades are utilized to protect the interior of an automobile from the intense infrared and ultraviolet radiation from the sun. These sunshades are formed from accordion-folded cardboard and are adapted to be stretched across the inside windshield of an automobile when the automobile is parked in the sun. These sunshades have achieved widespread popularity. Currently, when these sunshades are not in use, they are folded to a compact size and secured by a rubber band. Because these sunshades are formed from cardboard, they are susceptible to damage from bending and from contact with water brought into the interior of the automobile on the shoes of the automobile occupants. In order to provide adequate storage protection for these conventional sunshades, the present invention provides a case for the reception of the folded sunshade. Additionally, motorists experiencing mechanical difficulties such as a breakdown or a flat tire on the highway require a device to warn other motorists and to summon assistance. In order to simultaneously solve the sunshades storage problem and to provide a device for emergency highway signalling, a second embodiment of the present invention combines a sunshade storage case and a highway signal marker into a single compact package.

2. Description of the Prior Art

Various types of storage cases are known in the prior art. A typical example of such a storage case is to be found in U.S. Des. Pat. No. 214,308, which issued to Takashi Matsuo on June 3, 1969. This patent discloses an ornamented packing bag having a generally rectangular configuration. U.S. Pat. No. 214,309, which issued to Takashi Matsuo on June 3, 1969, discloses a similar, ornamented, generally rectangular packing bag. U.S. Pat. No. 3,550,839, which issued to W. Clayton et al on Dec. 29, 1970, discloses a double walled thermoplastic bag comprising a flattened tube formed from a thermoplastic laminate, with the tube being sealed at one end and the double walls of the bag being heat sealed together along a plurality of intersecting heat sealed areas. Air encapsulated in these heat sealed areas provides a protective packing for the contents of the bag. U.S. Pat. No. 3,547,340, which issued to R. McDonald on Dec. 15, 1970, discloses a plastic sheet designed to be used as a cover, separator or a wrapping material and a bag including two layers in surface to surface contact. Each of the layers is perforated, but the perforations of one layer are out of registry with those of the other, thereby forming an imperforate double layer which, when separated, forms two separate perforated layers through which air can easily pass. U.S. Pat. No. 3,782,434, which issued to E. Lebherz on Jan. 1, 1974, discloses a book bag formed from fabric material. The bag is formed from overlying fabric layers forming separate compartments and is designed to be supported over the shoulder of an individual. U.S. Des. Pat. No. 244,914, which issued to D. Nicol on July 5, 1977, discloses a generally rectangular ornamented bag provided with a looped handle. U.S. Des. Pat. No. 246,510, which issued to S. Lin on Nov. 29, 1977, discloses a generally rectangular plastic bag having a pair of spaced brackets on one side supporting a looped handle.

While the above mentioned devices are suited for their intended usage, none of these devices provide a suitable storage case for storing accordion-fold cardboard automobile sunshades in a protected environment. Additionally, none of the aforesaid devices disclose a storage case for automobile sunshades Which may also be utilized as an emergency highway marker. Inasmuch as the art is relatively crowded with respect to these various types of storage cases, it can be appreciated that there is a continuing need for and interest in improvements to such storage cases, and in this respect, the present invention addresses this need and interest.

SUMMARY OF THE INVENTION

In view of the foregoing disadvantages inherent in the known types of storage cases now present in the prior art, the present invention provides an improved sunshades storage case. As such, the general purpose of the present invention, which will be described subsequently in greater detail, is to provide a new and improved sunshades storage case which has all the advantages of the prior art storage cases and none of the disadvantages.

To attain this, representative embodiments of the concepts of the present invention are illustrated in the drawings and make use of an elongated generally rectangular case. The case is closed on three sides and is open at one end for the reception of the folded cardboard sunshades. The case is formed from two generally rectangular rigid plastic sheets which are joined along two longitudinal sides and on a bottom end by strips of a flexible plastic sheet material. The case may be compressed to a minimum thickness when the sunshades are removed, but expands to accommodate the sunshades in a protected environment. In a second embodiment, the sunshades case is formed as a generally rectangular receptacle having one open end provided with a hinged support bracket. The receptacle is formed from a tough flexible plastic sheet material which may be printed with a warning sign for use by motorists as a highway distress signal. The receptacle has a trapezoidal configuration when the supporting bracket is folded to an open position and has an upper end provided with a socket for receiving a highway flare.

There has thus been outlined, rather broadly, the more important features of the invention in order that the detailed description thereof that follows may be better understood, and in order that the present contribution to the art may be better appreciated. There are, of course, additional features of the invention that will be described hereinafter and Which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sunshades storage case which has all the advantages of the prior art storage cases and none of the disadvantages.

It is another object of the present invention to provide a new and improved sunshades storage case which may be easily and efficiently manufactured and marketed.

It is a further object of the present invention to provide a new and improved sunshades storage case which is of a durable and reliable construction.

An even further object of the present invention is to provide a new and improved sunshades storage case which is susceptible of a low cost of manufacture with regard to both materials and labor, and which accordingly is then susceptible of low prices of sale to the consuming public, thereby making such storage cases economically available to the buying public.

Still yet another object of the present invention is to provide a new and improved sunshades storage case which provides in the apparatuses and methods of the prior art some of the advantages thereof, while simultaneously overcoming some of the disadvantages normally associated therewith.

Still another object of the present invention is to provide a new and improved sunshades storage case for storing accordion-fold cardboard automobile sunshades in a protected environment.

Yet another object of the present invention is to provide a new and improved sunshades storage case for storing accordion-fold cardboard automobile sunshades which may be collapsed to a minimum thickness when not in use.

Even still another object of the present invention is to provide a new and improved sunshades storage case for storing accordion fold cardboard automobile sunshades in a protected environment and for providing an emergency highway marker.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view illustrating the manner of use of the storage case according to the first embodiment of the present invention.

FIG. 2 is a front view of the storage case according to the first embodiment of the present invention.

FIG. 3 is a side view of the storage case according to the first embodiment of the present invention, compressed to a minimum thickness.

FIG. 4 is a side view of the storage case according to the first embodiment of the present invention, illustrated expanded to a maximum thickness.

FIG. 5 is a perspective view of the storage case according to the second embodiment of the present invention.

FIG. 6 is a front view of the storage case according to the second embodiment of the present invention.

FIG. 7 is a side view of the sunshade storage case according to the second embodiment of the present invention, in a closed position.

FIG. 8 is a cross sectional view taken along line 8—8 of FIG. 6, illustrating the sunshades storage case according to the second embodiment of the present invention, in an open position.

DESCRIPTION OF THE PREFERRED EMBODIMENT

With reference now to the drawings, and in particular to FIG. 1 thereof, a new and improved sunshades storage case embodying the principles and concepts of the present invention and generally designated by the reference numeral 10 will be described.

More specifically, it will be noted that the first embodiment 10 of the invention includes a generally rectangular front panel 12 which is preferably formed from a thin rigid plastic sheet material. A similar back panel 14 extends in parallel relation to the front panel 12. The top portion 16 of the front panel 12 and the top portion 18 of the back panel 14 are provided with a circular curvature as illustrated. The front panel 12 and back panel 14 are secured in parallel relation by a pair of elongated side binding strips 20 and 22 which are secured to and extend along the longitudinal side edges of the front panel 12 and back panel 14. The bottom edges of the front panel 12 and back panel 14 are secured in a similar fashion by a bottom binding strip 24. The binding strips 20, 22 and 24 are preferably formed from a flexible plastic material such as polyethylene. A conventional accordion-fold cardboard automobile sunshades 11 may be stored within the case 10 by insertion of the sunshades 11 between the front panel 12 and back panel 14. The sunshades case 10 serves to protect the sunshades 11 against damage from bending and contact with water. The sunshades case 10 may be conveniently stored beneath the seat of an automobile.

In FIG. 2, a front view of the sunshades storage case 10 is provided.

In FIG. 3, a side view of the storage case 10 is provided, illustrating the front panel 12 and back panel 14 pressed together, reducing the case 10 to a minimum thickness. This compression is achieved by virtue of the flexible nature of the binding strips 20, 22 and 24. The case 10 may be compressed to this minimum thickness When the accordion-fold automobile sunshades 11 are removed from the case 10.

In FIG. 4, a side view of the storage case 10 is provided, expanded to a maximum thickness. In this condition, the accordion-fold sunshades may be easily stored within the interior of the case 10.

with reference now to FIG. 5, a second embodiment 30 of a sunshades storage case according to the present invention will now described. More specifically, it will be noted that the second embodiment 30 of the present invention includes a rectangular front panel 32 and a generally parallel rectangular back panel 33. The front panel 32 is connected to the back panel 33 by a pair of generally triangular side panels 34 and 36. The front 32, back 33 and side panels 34 and 36 are preferably formed from a flexible plastic material such as vinyl. This material provides sufficient rigidity to enable the storage case 30 to maintain its shape, but allows the case 30 to be folded between opened and closed positions. A pair of hollow cylindrical loops 40 and 48 are transversely attached to the front panel 32 and rear panel 33, adjacent a bottom end portion 38 of the case 30. A pair of generally U-shaped cylindrical bars 42 and 46 extend through the loops 40 and 48. The bars 42 and 46 are pivotally connected by a pair of hinges disposed adjacent bottom side portions of the case 30. One of the hinges 44 may be seen in FIG. 5. An emergency highway distress signal 50 may be printed on the front panel 32 and rear panel 33. A rectangular top bracket 52 is secured to the tops of the front panel 32, rear panel 33, and side panels 34 and 36. A cylindrical recessed socket 53 is centrally formed on the top bracket 52 for removably retaining a conventional flare 54. To utilize the case 30 as an emergency highway marker, the bars 42 and 46 are folded to the illustrated open position. This spreads apart the bottom end 38 of the case 30, forming a stable base for supporting the case 30 in the illustrated generally vertical position. The case 30 is formed from a material which is sufficiently flexible to allow folding between opened and closed positions, yet is rigid enough to maintain a vertical position. The case 30 is placed on the surface of the roadway, adjacent the motorist's vehicle. A flare 54 may be lit and supported by the top bracket 52. The case 30 may be formed from an orange colored material so as to provide a highly visible warning signal.

In FIG. 6, a front view of the case 30 is provided. The case 30 is illustrated folded to a closed position. In this condition, a conventional accordion fold sunshades may be stored in a protected environment within the interior of the case 30, by insertion through the bottom end 38. The second hinge 45 is illustrated in this view.

In FIG. 7, a side view of the case 30 is provided.

In FIG. 8, a cross sectional view taken along line 8—8 of FIG. 6 illustrates the case 30 with the bars 42 and 46 folded to an open position. In this configuration, the storage case 30 assumes a generally trapezoidal configuration as illustrated in FIG. 5. The loops 40 and 48 formed on the bottom end 38 of the case 30 retain the bars 42 and 46. As may now be readily understood, the sunshades storage case 30 according to the second embodiment of the present invention accomplishes the dual functions of storing a conventional accordion-fold cardboard automobile sunshades in a protected environment and providing an emergency highway marker for use by motorists in distress.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved sunshades storage case for use with an accordion-fold cardboard automobile sunshade, said storage case comprising:
   a pair of generally rectangular front and back panels formed from a flexible plastic material;
   emergency highway signal markings printed on said front and back panels;
   a pair of generally triangular side panels formed from a flexible plastic material;
   said side panels secured in opposed parallel relation between said front and back panels;
   a cylindrical loop formed at a bottom end of each of said front and back panels;
   a U-shaped bar extending through each of said loops;
   a pair of hinges pivotally connecting ends of said U-shaped bars adjacent a bottom end of each of said side panels, said U-shaped bars mounting bottom ends of said front and back panels for movement between opened and closed positions;
   a generally rectangular top bracket extending transversely across a top end of said front and back panels, said top bracket secured to said front, back, and side panels;
   a cylindrical recessed socket centrally formed in a top surface of said top bracket; and
   said storage case having a vertical trapezoidal configuration when in said opened position.

2. A new and improved sunshades storage case for use with an accordion-fold cardboard automobile sunshade, said storage case comprising:
   an elongated case having an open end and three closed sides;
   said case having a pair of generally rectangular front and back panels formed from a flexible plastic material;
   emergency highway signal markings printed on said front and back panels;
   a pair of generally triangular side panels formed from a flexible plastic material;
   said side panels secured in opposed parallel relation between said front and back panels;
   a cylindrical loop formed at a bottom end of each of said front and back panels;
   a U-shaped bar extending through each of said loops; and
   a pair of hinges pivotally connecting ends of said bars adjacent a bottom end of each of said side panels.

3. The sunshades storage case of claim 2, further comprising a generally rectangular top bracket extending transversely across a top end of said front and back panels, said top bracket secured to said front, back, and side panels.

4. The sunshades storage case of claim 3, further comprising a cylindrical recessed socket centrally formed in a top surface of said top bracket.

* * * * *